US012565967B2

(12) United States Patent (10) Patent No.: US 12,565,967 B2
Song et al. (45) Date of Patent: Mar. 3, 2026

(54) NON-METALLIC, MULTI-COMPARTMENT HIGH-PRESSURE TANK FOR A VEHICLE

(71) Applicant: WAL Fuel Systems USA Inc., Livonia, MI (US)

(72) Inventors: Xiankai Song, Livonia, MI (US); Sami Siddiqui, Livonia, MI (US); Longhan Chen, Livonia, MI (US)

(73) Assignee: WAL Fuel Systems USA Inc., Livonia, MI (US)

( * ) Notice: Subject to any disclaimer, the term of this patent is extended or adjusted under 35 U.S.C. 154(b) by 0 days.

(21) Appl. No.: 18/667,250

(22) Filed: May 17, 2024

(65) Prior Publication Data

US 2025/0354656 A1 Nov. 20, 2025

(51) Int. Cl.
*F17C 1/16* (2006.01)
*B60R 16/08* (2006.01)

(52) U.S. Cl.
CPC .............. *F17C 1/16* (2013.01); *B60R 16/08* (2013.01); *F17C 2201/0109* (2013.01); *F17C 2201/0166* (2013.01); *F17C 2203/013* (2013.01); *F17C 2203/0663* (2013.01); *F17C 2205/0153* (2013.01); *F17C 2221/031* (2013.01); *F17C 2270/0168* (2013.01)

(58) Field of Classification Search
CPC ...... F17C 1/16; F17C 1/06; F17C 2201/0166; F17C 2203/011; F17C 2203/012; F17C 2203/013; F17C 2203/0663; F17C 2221/031
See application file for complete search history.

(56) References Cited

U.S. PATENT DOCUMENTS

| | | | | |
|---|---|---|---|---|
| 1,952,867 | A * | 3/1934 | Jensen ...................... | B60P 3/24 |
| | | | | 220/564 |
| 3,240,644 | A * | 3/1966 | Wolff ................... | B29D 22/003 |
| | | | | 220/62.19 |
| 5,383,566 | A * | 1/1995 | Johnson .................. | B60T 17/06 |
| | | | | 220/586 |
| 2007/0193282 | A1* | 8/2007 | Grayson ................... | F17C 3/10 |
| | | | | 62/48.3 |
| 2012/0080875 | A1* | 4/2012 | Schultheis ............ | F17C 13/084 |
| | | | | 280/834 |
| 2012/0228308 | A1* | 9/2012 | Lai ........................ | F24D 3/1041 |
| | | | | 220/581 |
| 2015/0274006 | A1* | 10/2015 | Chung ............ | B60K 15/03006 |
| | | | | 264/46.7 |
| 2022/0170593 | A1* | 6/2022 | Lee ........................... | F17C 1/02 |

FOREIGN PATENT DOCUMENTS

| | | | | |
|---|---|---|---|---|
| WO | WO-2014070021 A1 * | 5/2014 | ............. | F17C 1/002 |
| WO | WO-2015040648 A2 * | 3/2015 | ............. | B29C 53/56 |

* cited by examiner

*Primary Examiner* — Javier A Pagan

(74) *Attorney, Agent, or Firm* — Young Basile Hanlon & MacFarlane, P.C.

(57) ABSTRACT

A (high-pressure) tank for a vehicle that includes a tank body, which defines a first end, a second end, and a longitudinal axis, and a bolster that is wound about the tank body to increase the strength of the high-pressure tank. The tank body is formed from a non-metallic material and includes a first compartment and a second compartment that is isolated from the first compartment so as to inhibit fluid communication therebetween.

17 Claims, 7 Drawing Sheets

NON-METALLIC, MULTI-COMPARTMENT HIGH-PRESSURE TANK FOR A VEHICLE

TECHNICAL FIELD

The present disclosure relates to the reinforcement of high-pressure tanks for vehicles (e.g., trucks, semitrailers, tractor-trailers, etc.).

BACKGROUND

High-pressure tanks are often used to store various fluids (e.g., air, liquids, etc.) that support the operation of one or more systems on a vehicle (e.g., the braking system, the suspension system, etc.) and are available in metallic, non-metallic, single compartment, and multi-compartment varieties. In order to increase the strength and/or the durability of non-metallic tanks, a (strengthening) bolster (e.g., a filament) is often applied to (wound about) the exterior surface of the tank in its entirety in a generally uniform (even) distribution, which significantly impedes the incorporation and the positioning (location, placement) of functional attachments (e.g., inlet and outlet ports, drain ports, mounting members, (pressure) sensor housing(s), etc.). More specifically, due to the operational constraints imposed by traditional (known) winding procedures, functional attachments are often confined to the ends (poles) of the tanks.

As such, a need remains for reinforced single and multi-compartment high-pressure tanks including a bolster that accommodates more robust incorporation and positioning of functional attachments.

SUMMARY

In one aspect of the present disclosure, a high-pressure tank for a vehicle is disclosed that includes a tank body and a bolster.

The tank body defines a longitudinal axis and includes: a main body portion; a first end cap; and a second end cap.

The main body portion includes a plurality of mounting members that are configured to connect the high-pressure tank to the vehicle.

The first end cap is connected to the main body portion at a first end thereof and includes an inlet port that is configured to allow compressed air to enter the high-pressure tank.

The second end cap is connected to the main body portion at a second end thereof and includes an outlet port that is configured to allow compressed air to exit the high-pressure tank.

The bolster is wound about the tank body to increase the strength of the high-pressure tank. The bolster is applied to the tank body so as to define open regions that extend about the mounting members, the inlet port, and the outlet port such that the mounting members, the inlet port, and the outlet port are exposed from the bolster.

In certain embodiments, the tank body may be unitary in construction such that the main body portion, the first end cap, and the second end cap are formed from a single piece of material.

In certain embodiments, the mounting members, the inlet port, and the outlet port may be integrally formed with the tank body.

In certain embodiments, at least one of first end cap and the second end cap may further include at least one drain port that is configured to facilitate drainage of the high-pressure tank.

In certain embodiments, the bolster may be applied to the tank body so as to define at least one open region that extends about the at least one drain port such that the at least one drain port is exposed from the bolster.

In certain embodiments, the open regions may be non-identical in configuration.

In certain embodiments, the bolster may include at least one filament.

In certain embodiments, the at least one filament may include a first filament that is wound about the tank body in a first pattern and a second filament that is wound about the tank body in a second pattern that is different from the first pattern.

In certain embodiments, the first filament may be wound about the tank body such that the first filament extends at a first angle in relation to the longitudinal axis, and the second filament may be wound about the tank body such that the second filament extends at a second angle in relation to the longitudinal axis that is larger than the first angle.

In certain embodiments, the first filament may be wound about the tank body such that the first angle lies substantially within the range of approximately 10 degrees to approximately 30 degrees, and the second filament may be wound about the tank body such that the second angle lies substantially within the range of approximately 45 degrees to approximately 90 degrees.

In another aspect of the present disclosure, a high-pressure tank for a vehicle is disclosed that includes a tank body, which includes a plurality of functional attachments, and a bolster, which is wound about the tank body to increase strength of the high-pressure tank. The bolster is applied to the tank body so as to define open regions that extend about the functional attachments such that the functional attachments are exposed from the bolster.

In certain embodiments, the tank body may include: a main body portion; a first end cap that is connected to the main body portion at a first end thereof; and a second end cap that is connected to the main body portion at a second end thereof.

In certain embodiments, the tank body may be unitary in construction such that the main body portion, the first end cap, and the second end cap are formed from a single piece of material.

In certain embodiments, the main body portion may include a plurality of mounting members that are configured to connect the high-pressure tank to the vehicle.

In certain embodiments, the first end cap may include an inlet port that is configured to allow compressed air to enter the high-pressure tank.

In certain embodiments, the second end cap may include an outlet port that is configured to allow compressed air to exit the high-pressure tank.

In certain embodiments, the open regions may be non-identical in configuration.

In another aspect of the present disclosure, a high-pressure tank for a vehicle is disclosed that includes a tank body, which defines a longitudinal axis and includes a plurality of functional attachments, and a bolster, which is wound about the tank body so as to avoid the plurality of functional attachments and increase strength of the high-pressure tank. The bolster includes a first section that is applied to the tank body in a first pattern and a second section that is applied to the tank body in a second pattern that is different from the first pattern.

In certain embodiments, the first section of the bolster may include a first filament, and the second section of the bolster may include a second filament.

In certain embodiments, the bolster may be wound about the tank body such that the first pattern defines open regions that extend about the plurality of functional attachments and the second pattern is devoid of any open regions.

In certain embodiments, the bolster may be wound about the tank body such that, in the first section, the bolster extends at a first angle in relation to the longitudinal axis and, in the second section, the bolster extends at a second angle in relation to the longitudinal axis that is larger than the first angle.

In certain embodiments, the bolster may be wound about the tank body such that the first angle lies substantially within the range of approximately 10 degrees to approximately 30 degrees and the second angle lies substantially within the range of approximately 45 degrees to approximately 90 degrees.

In another aspect of the present disclosure, a high-pressure tank for a vehicle is disclosed that includes a tank body, which defines a longitudinal axis, and a bolster that is wound about the tank body to increase the strength of the high-pressure tank. The tank body is formed from a non-metallic material and includes a first compartment and a second compartment that is isolated from the first compartment so as to inhibit fluid communication therebetween.

In certain embodiments, the second compartment may extend about the first compartment.

In certain embodiments, wherein the first compartment and the second compartment are arranged in end-to-end relation along the longitudinal axis.

In certain embodiments, the tank body may further include at least one reinforcement member that is positioned within the first compartment to inhibit deflection thereof.

In certain embodiments, the at least one reinforcement member may be configured as a discrete component of the tank body.

In certain embodiments, the at least one reinforcement member may be fixed in relation to an inner wall of the first compartment.

In certain embodiments, the tank body may further include stoppers that are configured to constrain the at least one reinforcement member and thereby inhibit movement of at least one reinforcement member within the first compartment.

In certain embodiments, the stoppers may include first stoppers having a first configuration and second stoppers having a second configuration that is different than the first configuration.

In certain embodiments, the tank body may further include a plurality of functional attachments that are distributed across the tank body.

In certain embodiments, the bolster may be applied to the tank body so as to define open regions that extend about the plurality of functional attachments.

In another aspect of the present disclosure, a high-pressure tank for a vehicle is disclosed that includes a tank body, which defines a first end, a second end, and a longitudinal axis, and a bolster that is wound about the tank body to increase the strength of the high-pressure tank. The tank body is formed from a non-metallic material and includes: a main body portion defining a first end and a second end; a first end cap that is connected to the first end of the main body portion; a second end cap that is connected to the second end of the main body portion; a first compartment; a second compartment that is separated from the first compartment by an internal divider; and a plurality of functional attachments that are distributed across the tank body, wherein the bolster is applied to the tank body so as to define open regions that extend about the plurality of functional attachments.

In certain embodiments, the first compartment and the second compartment may each extend from the first end of the tank body to the second end of the tank body.

In certain embodiments, the internal divider may extend in generally parallel relation to the longitudinal axis.

In certain embodiments, the first compartment and the second compartment may be arranged in concentric relation.

In certain embodiments, the internal divider may extend in transverse relation to the longitudinal axis.

In another aspect of the present disclosure, a high-pressure tank for a vehicle is disclosed that includes a tank body, which defines a longitudinal axis, and a bolster that is wound about the tank body to increase the strength of the high-pressure tank. The tank body is formed from a non-metallic material and includes: a main body portion defining a first end and a second end; a first end cap that is connected to the first end of the main body portion; a second end cap that is connected to the second end of the main body portion; a first compartment; a second compartment that is separated from the first compartment such that the first compartment and the second compartment define discrete interior cavities; and a plurality of functional attachments that are distributed across the tank body, wherein the bolster is applied to the tank body so as to define open regions that extend about the plurality of functional attachments. The plurality of functional attachments include: a first inlet port that is configured to allow compressed air to enter the first compartment; a first outlet port that is configured to allow compressed air to exit the first compartment; a second inlet port that is configured to allow compressed air to enter the second compartment; a second outlet port that is configured to allow compressed air to exit the second compartment; a plurality of mounting members that are configured to connect the high-pressure tank to the vehicle; and at least one drain port that is configured to facilitate drainage of the high-pressure tank.

In certain embodiments, the first inlet port and the second inlet port may each be included on the first end cap, and the first outlet port and the second outlet port may each be included on the second end cap.

In certain embodiments, the first inlet port and the first outlet port may each be included on the first end cap, and the second inlet port and the second outlet port may each be included on the second end cap.

In certain embodiments, the tank body may further include at least one reinforcement member that is positioned within the first compartment to inhibit deflection thereof.

In certain embodiments, the tank body may further include stoppers that are configured to constrain the at least one reinforcement member and thereby inhibit movement of the at least one reinforcement member along the longitudinal axis.

BRIEF DESCRIPTION OF THE DRAWINGS

The present disclosure is best understood from the following detailed description when read in conjunction with the accompanying drawings. It is emphasized that, according to common practice, the various features of the drawings may be not to-scale. On the contrary, the dimensions of the various features may be arbitrarily expanded or reduced for clarity.

DETAILED DESCRIPTION

The present disclosure describes reinforced (high-pressure) single and multi-compartment high-pressure tanks for vehicles. The tanks described herein include a tank body with functional attachments (e.g., inlet and outlet ports, drain ports, mounting members, etc.) and a (strengthening) bolster that is applied to the tank body such that the functional attachments are exposed therefrom, which facilitates more robust incorporation and positioning of the functional attachments.

Figure 1:
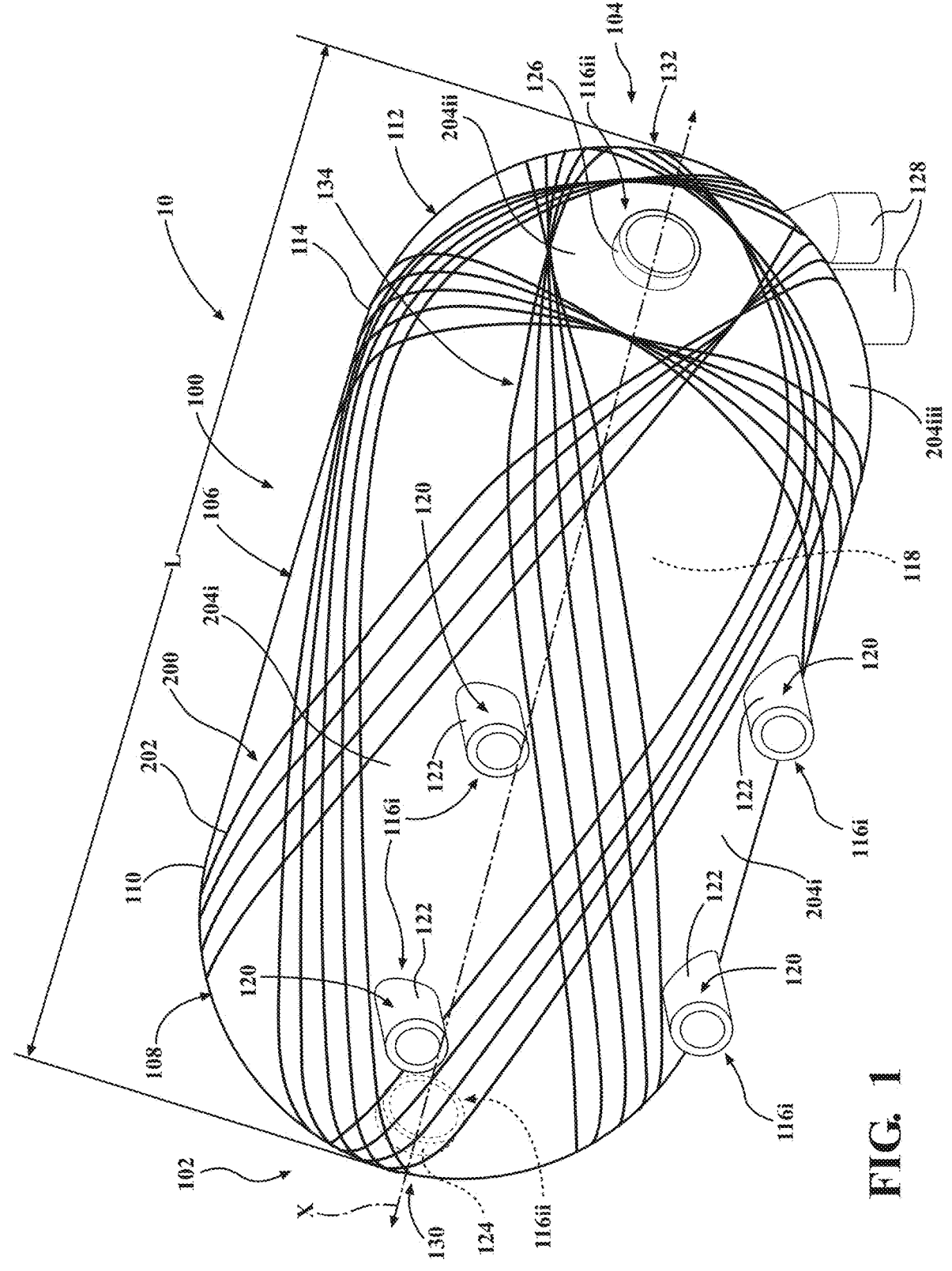
FIG. 1 is a side, perspective view of a (high-pressure) tank according to one embodiment of the present disclosure, which includes a tank body and a bolster that is applied to the tank body 100 in a single pattern.

With reference now to FIG. 1, a (high-pressure) tank 10 is disclosed that is configured for use in storing one or more fluids (e.g., air, liquid) that support the operation of one or more systems on a vehicle (e.g., the braking system, the suspension system, etc.). The tank 10 defines a length L and includes a tank body 100 and a (strengthening) bolster 200, which is applied to (wound about) the tank body 100. While the tank 10 is generally illustrated and described as being configured for use with a truck (e.g., a semitrailer, a tractor-trailer, etc.), it should be appreciated that the present disclosure may find applicability to a wide variety of vehicles.

The tank body 100 defines a longitudinal axis X and includes: respective first and second ends 102, 104; a main body portion 106, which is generally cylindrical in configuration; a (first) end cap 108, which is connected (secured) to a (first) end 110 of the main body portion 106; a (second) end cap 112, which is connected (secured) to a (second) end 114 of the main body portion 106; and a plurality (series) of functional attachments 116, which are distributed across the tank body 100 (i.e., the main body portion 106, the end cap 108, and/or the end cap 112); and one or more (interior, internal) compartments (storage areas) 118, which are configured to receive (store) a fluid (e.g., to support operation of the braking system on the vehicle, the suspension system on the vehicle, etc.).

The main body portion 106 includes (one or more) at least one (first) functional attachment 116*i*. More specifically, in the illustrated embodiment, the main body portion 106 includes a plurality of mounting members 120 (e.g., bosses 122) that are configured to connect (secure) the tank 10 to the vehicle (e.g., via one or more mechanical fasteners, etc.).

Figure 10:
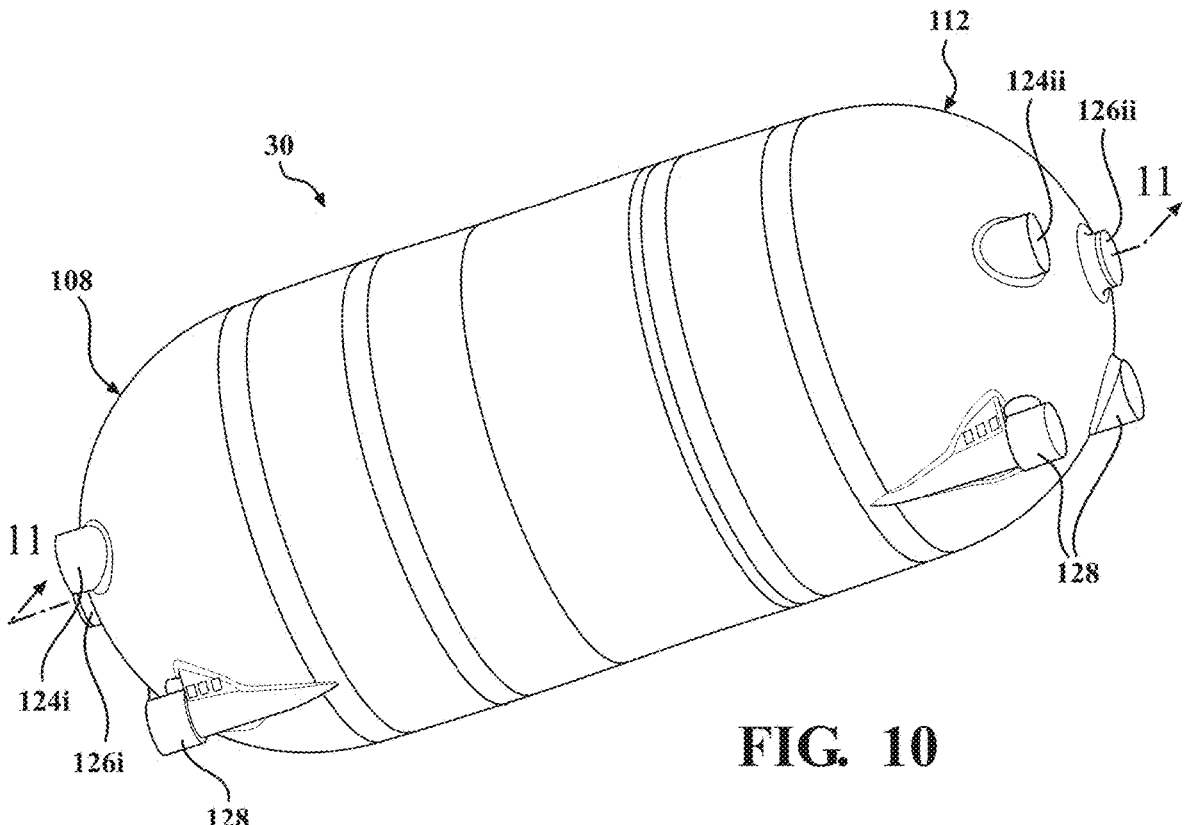
FIG. 10 is a side, perspective view of a (high-pressure) tank according to another embodiment of the present disclosure, which includes multiple (interior, internal) compartments that are arranged in end-to-end relation.

The end caps 108, 112 are dome-like (e.g., hemispherical) in configuration, and include (one or more) at least one (second) functional attachment 116*ii*. More specifically, in the illustrated embodiment, the end cap 108 includes an inlet port 124, and the end cap 112 includes an outlet port 126 as well as one or more drain ports 128. The inlet and outlet ports 124, 126 are (centrally) positioned (located) on the end caps 108, 112 at (opposite, first and second) poles 130, 132 of the high pressure tank 10 and are configured to allow compressed air to enter and exit the tank 10, respectively, and the drain port(s) 128 are configured to facilitate drainage of the tank 10 and allow for the removal of moisture (e.g., humidity) therefrom. Although shown as extending from the tank body 100 in generally orthogonal relation to the longitudinal axis X in FIG. 1, embodiments in which the drain port(s) 128 may extend in generally parallel relation thereto are also envisioned herein, as seen in FIG. 10.

The tank body 100 includes (i.e., is formed from) a non-metallic, composite material (e.g., Nylon PA6 GFx, PA66 GFx, PAPA GFx, or other such similar engineering plastic). In the illustrated embodiment, the tank body 100 is unitary (monolithic) in construction such that the main body portion 106, the end caps 108, 112, and the functional attachments 116 are integrally formed from a single piece of material. Embodiments in which the main body portion 106, the end caps 108, 112, and/or the functional attachments 116 may be formed as separate, discrete components of the tank 10 are also envisioned herein, however, as are embodiments in which the main body portion 106 may include two or more discrete segments, and would not be beyond the scope of the present disclosure. In such embodiments, it is envisioned that the main body portion 106 (e.g., the segments thereof), the end caps 108, 112, and the functional attachments 116 may be connected (secured) together in any suitable manner such as, for example, via welding (e.g., hot gas welding, infrared welding, spin welding, vibration welding, ultrasonic welding, etc.).

In various embodiments, it is envisioned that the number, the configurations, and/or the positions (locations) of the functional attachments 116 may be varied (e.g., depending upon the configuration and/or the volume of the tank 10, the particular vehicle with which the tank 10 will be utilized, etc.) without departing from the scope of the present disclosure. For example, embodiments in which the mounting members 120 may be positioned (located) on the end cap 108 and/or the end cap 112 are envisioned herein, as are embodiments in which the drain port(s) 128 may be positioned (located) on the end cap 108, either in addition to or instead of the end cap 112, or the main body portion 106, and embodiments in which the functional attachments 116 may include (one or more) at least one (pressure) sensor housing.

In the illustrated embodiment, the tank body 100 is shown as including a single compartment 118. Embodiments in which the tank body 100 may include multiple compartments 118 are also envisioned herein, however, as described in further detail below.

The bolster 200 is configured to support load on the tank 10 and provides a structural reinforcement that increases the strength (e.g., the rigidity) thereof so as to inhibit (if not entirely prevent) deflection (e.g., bending, flexure, or other such deformation). The bolster 200 extends between the ends 102, 104 of the tank body 100 (i.e., such that the bolster 200 extends along the entire length L of the tank 10) and includes (one or more) at least one filament (strand) 202 of composite material, which may be reinforced (impregnated) with unidirectional glass fibers. For example, it is envisioned that the fiber content of the bolster 200 may lie substantially within the range of approximately 40% to approximately 80%. A bolster 200 in which the fiber content may lie outside the disclosed range is also envisioned herein (e.g., depending upon the intended use of the tank 10), however, and would not be beyond the scope of the present disclosure.

In certain embodiments, it is envisioned that the bolster 200 may applied to (wound about) the tank body 100 such that the filament(s) 202 are oriented at optimal fiber angles so as to maximize the strength of the tank 10 and increase uniformity in load distribution while reducing the overall weight thereof.

The bolster 200 is applied to the main body portion 106 and the end caps 108, 112, either axisymmetrically or non-axisymmetrically, as a partial winding that defines a plurality of open regions 204, which, depending upon the configurations, the sizes, and/or the specific locations of the functional attachments 116, may define any suitable geometrical configuration, either polygonal or non-polygonal (e.g., circular, square, pentagonal, hexagonal, etc.).

The open regions 204 extend about (receive) and thereby avoid the functional attachments 116 such that the functional attachment 116 are exposed from (e.g., extend through, protrude beyond) the bolster 200. Inhibiting (if not preventing) the application of the bolster 200 to the functional attachments 116 facilitates more robust incorporation of the functional attachments 116 as well as more robust positioning of the functional attachments 116 on the tank body 100.

In order to further increase the strength of the tank 10 and provide additional support to the tank body 100 in the areas corresponding to the open regions 204, it is envisioned that the tank body 100 may include one or more (internal) strengthening members, as described in further detail below.

In the illustrated embodiment, the bolster 200 defines: (first) open regions 204*i*, which extend about (receive) the mounting members 120; (second) open regions 204*ii*, which extend about (receive) the inlet and outlet ports 124, 126 respectively included on the end caps 108, 112; and (one or more) at least one (third) open region 204*iii*, which extends about (receives) the drain port(s) 128, whereby the mounting members 120, the respective inlet and outlet ports 124, 126, and the drain port(s) 128 are exposed from (e.g., extend through, protrude beyond) the bolster 200. As seen in FIG. 1, the bolster 200 is applied to the tank body 100 in a single pattern 134 in which the open regions 204 are non-identical in configuration and vary (e.g., in shape and/or size) across the tank 10, which allows the bolster 200 to accommodate a wider variety of functional attachments 116 (i.e., depending upon the configurations and/or the sizes thereof) in a wider variety of positions (locations). Embodiments in which the bolster 200 may be applied to the tank body 100 in multiple patterns 134 are also envisioned herein, however, as described in further detail below, as are embodiments in which the bolster 200 may define open regions 204 that are generally identical, and would not be beyond the scope of the present disclosure.

In the embodiment illustrated in FIG. 1, the bolster 200 includes a single filament 202 with a width that lies substantially within the range of approximately 1 mm to approximately 15 mm (e.g., approximately 5 mm) and a thickness that lies substantially within the range of approximately 15 mm to approximately 6 mm (e.g., approximately 0.5 mm). A bolster 200 in which the width and/or the thickness may lie substantially outside the disclosed range is also envisioned herein (e.g., depending upon the intended use of the tank 10), however, and would not be beyond the scope of the present disclosure.

Figures 2, 3, 4:
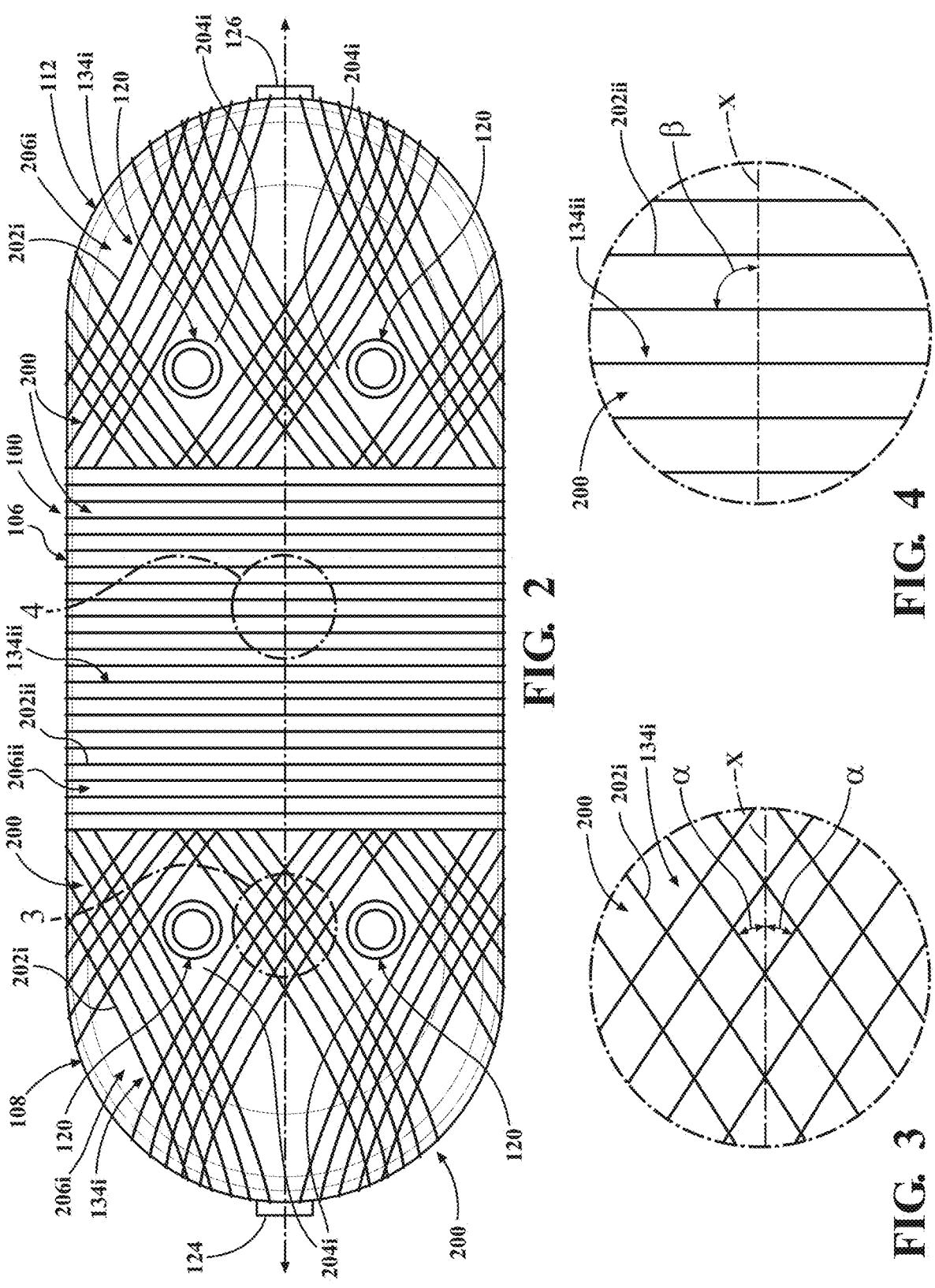
FIG. 2 is side, plan view of the tank seen in FIG. 1 according to another embodiment of the present disclosure in which the bolster is applied to the tank body in multiple patterns.
FIGS. 3 and 4 are enlargements of the areas of detail identified in FIG. 2.

FIGS. 2-4 illustrate another embodiment of the present disclosure in which the bolster 200 includes multiple (i.e., two or more) filaments 202. For example, in the illustrated embodiment, the bolster 200 includes (first) sections 206*i*, which include (first) filaments 202*i* that are applied to (wound about) the tank body 100 (i.e., the end caps 108, 112) in (first) patterns 134*i*, and a (second) section 206*ii*, which includes a (second) filament 202*ii* that is applied to (wound about) the tank body 100 (i.e., the main body portion 106) in a (second) pattern 134*ii* that is different from the first pattern 134*i*. More specifically, whereas the pattern 134*i* defines the aforementioned open regions 204*i*, 204*ii*, 204*iii* (FIG. 1), which extend about (receive) the mounting members 120, the respective inlet and outlet ports 124, 126, and the drain port(s) 128, respectively, the pattern 134*ii* is devoid of any open regions 204. Embodiments in which a single filament 202 may be applied to the tank body 100 in multiple patterns 134 (e.g., patterns 134*i*, 134*ii*) are also envisioned herein, however, and would not be beyond the scope of the present disclosure.

The bolster 200 is applied to (wound about) the tank body 100 such that, in the section 206*i*, the bolster 200 (i.e., the filament 202*i*) extends at a (first) angle α (FIG. 3) in relation to the longitudinal axis X and, in the section 206*ii*, the bolster 200 (i.e., the filament 202*ii*) extends at a (second) angle β (FIG. 4) in relation to the longitudinal axis X that is different from (i.e., larger (greater) than) the angle α. In the illustrated embodiment, the bolster 200 is applied to the tank body 100 such that the angle α lies substantially within the range of approximately 10 degrees to approximately 30 degrees, which facilitates avoidance of the functional attachments 116 (FIG. 1), and such that the angle β lies substantially within the range of approximately 45 degrees to approximately 90 degrees. Embodiments in which the bolster 200 (e.g., the filaments 202*i*, 202*ii*) may be applied to the tank body 100 such that the angle α and/or the angle β lies outside of the disclosed range are also envisioned herein (e.g., depending upon the configurations, the sizes, and/or the specific locations of the functional attachments 116), however, and would not be beyond the scope of the present disclosure. Additionally, in various embodiments, it is envisioned that the angle α and/or the angle β may be either uniform (consistent) or non-uniform (variable) across the tank body 100 (i.e., the section 206*i* and/or the section 206*ii*). For example, in the illustrated embodiment, it is envisioned that the angle α may vary across the tank body 100 (i.e., the main body portion 106 and/or the end caps 108, 112) as a result of the non-identical configurations of the open regions 204*i*, 204*ii*, 204*iii*.

With reference again to FIG. 1, various methods of manufacturing the tank 10 will be discussed.

Prior to assembly of the tank 10, the tank body 100 and the bolster 200 are provided as separate, discrete components. For example, it is envisioned that the tank body 100 (i.e., the main body portion 106, the end caps 108, 112, and the functional attachments 116) may be integrally formed (e.g., via injection molding) or, alternatively, that one or more of the main body portion 106, the end caps 108, 112, and the functional attachments 116 may be provided as separate, discrete components that may be connected (secured) together in any suitable manner.

The bolster 200 is then applied to the tank body 100 via a winding procedure in one or more of the patterns 134. In the embodiment illustrated in FIG. 1, for example, the bolster 200 is applied to the tank body 100 in a single pattern 134, whereas in the embodiment illustrated in FIGS. 2-4, the bolster 200 is applied to the tank body 100 in multiple patterns 134i, 134ii.

During the winding procedure, the bolster 200 is applied to the tank body 100 by winding the filament(s) 202 about the main body portion 106 and the end caps 108, 112 so as to avoid the functional attachments 116, thereby inhibiting (if not entirely preventing) the application of the bolster 200 to the functional attachments 116. The winding procedure described herein thus inhibits (if not entirely prevents) interference with the application of the bolster 200 to the tank body 100 that may otherwise be caused by the functional attachments 116 during traditional (known) winding procedures.

Figure 5:
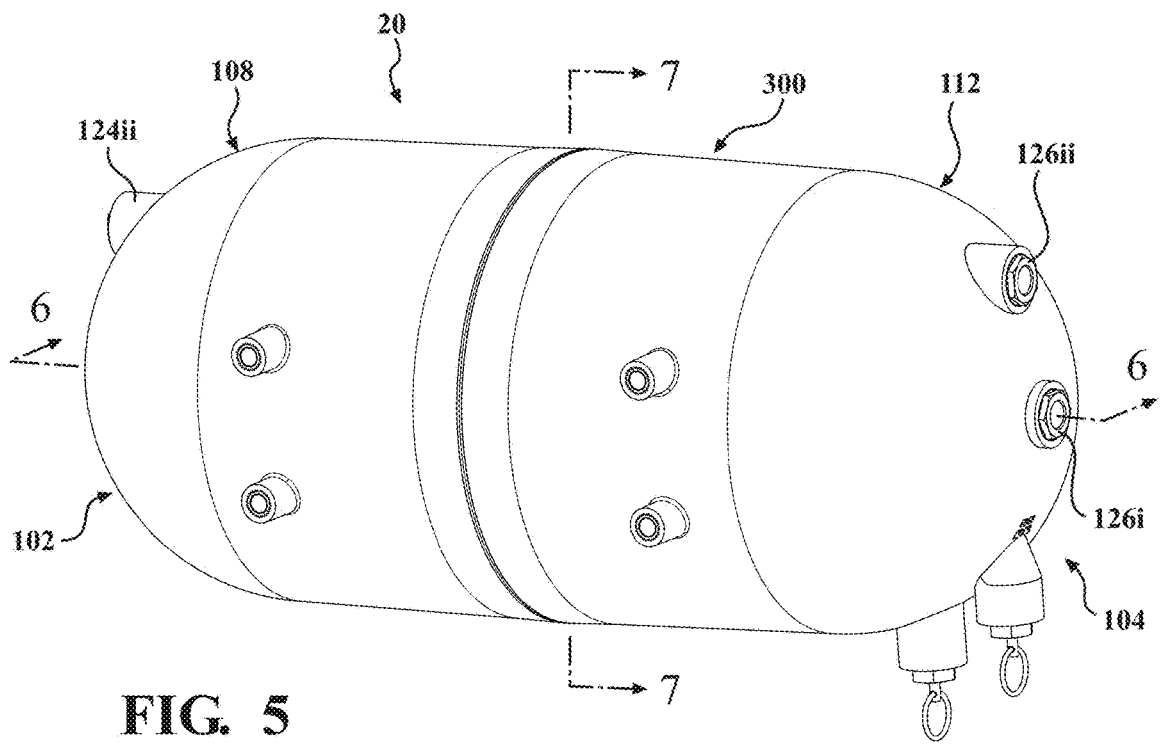
FIG. 5 is a side, perspective view of a (high-pressure) tank according to another embodiment of the present disclosure, which includes multiple (interior, internal) compartments that are arranged concentrically.
Figure 6:
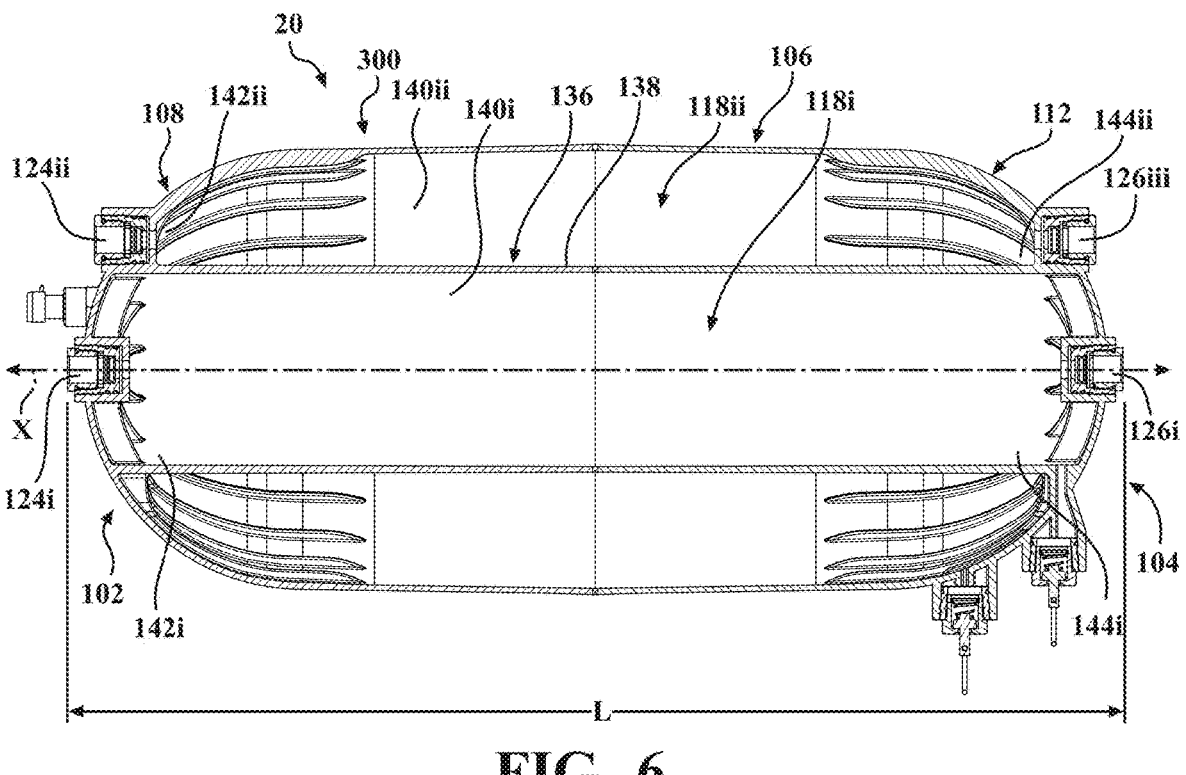
FIG. 6 is a cross-sectional view taken along line 6-6 in FIG. 5.
Figure 7:
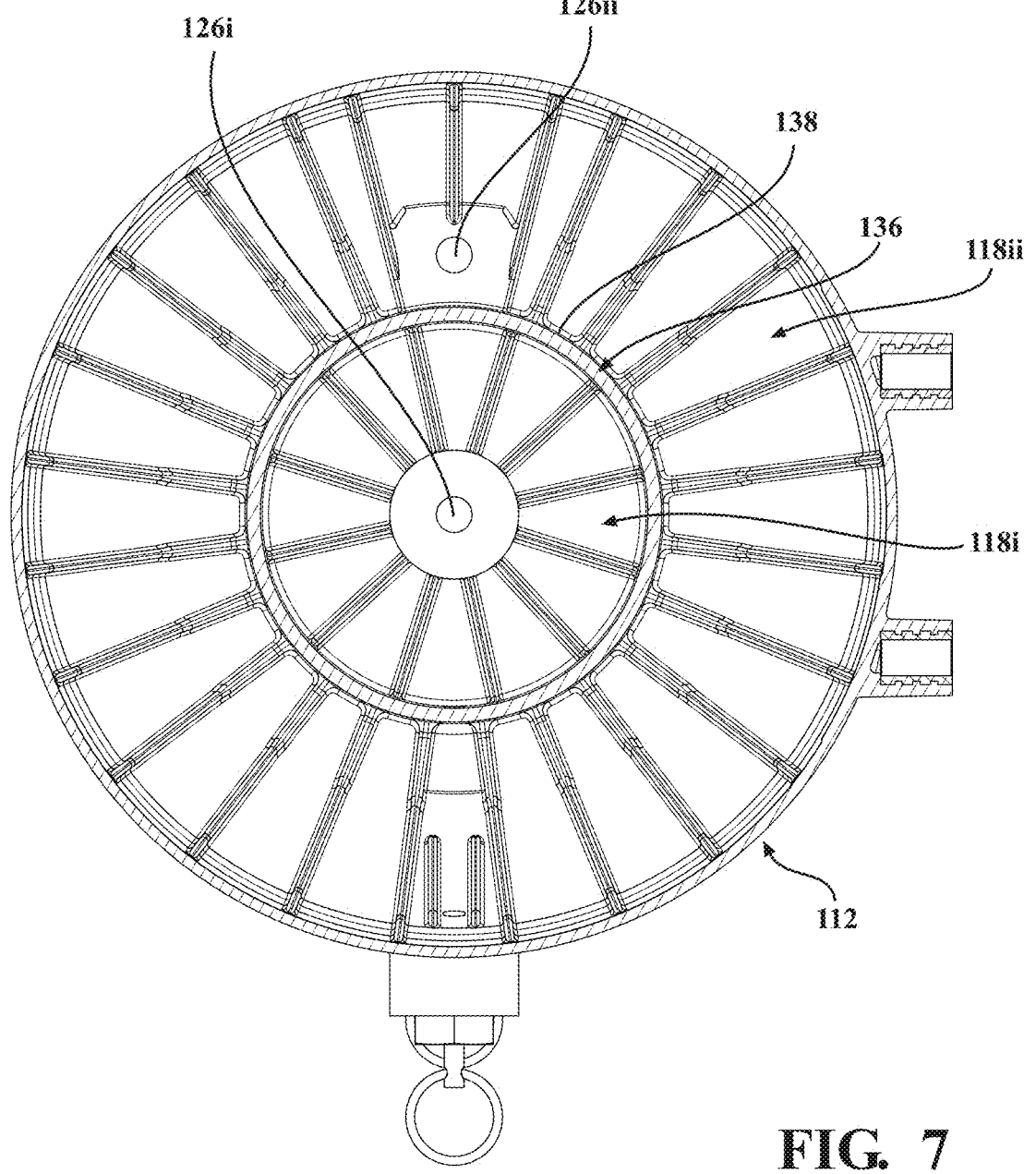
FIG. 7 is a cross-sectional view taken along line 7-7 in FIG. 5.

With reference now to FIGS. 5-7, a multi-compartment embodiment of the tank 10 will be discussed, which is identified by the reference character 20. The tank 20 is substantially similar to the tank 10 discussed above (FIGS. 1-4) and, accordingly, will only be discussed with respect to any differences therefrom in the interest of brevity. As such, identical reference characters will be utilized to refer to elements, structures, features, etc., common to the tanks 10, 20. In the interest of clarity, although included on the tank 20, the bolster 200 (FIG. 1) is not illustrated in FIGS. 5-7.

In contrast to the tank 10, in which the tank body 100 includes a single compartment 118 (FIG. 1), the tank 20 includes a tank body 300 with multiple compartments 118 (i.e., a (first) compartment 118i and a (second) compartment 118ii), which facilitate the storage of one or more fluids to support multi-functional operation. For example, it is envisioned that the compartment 118i may be utilized to support braking of the vehicle, and that the compartment 118ii may be utilized to support locking of the vehicle wheels.

In the illustrated embodiment, the tank body 300 is configured such that the volume of the compartment 118i exceeds that of the compartment 118ii. Embodiments in which the tank body 300 may be configured such that the volumes of the compartments 118i, 118ii are approximately equal are also envisioned herein, however, and would not be beyond the scope of the present disclosure.

The compartments 118i, 118ii are isolated from each other, which inhibits (if not entirely prevents) fluid communication therebetween. More specifically, the compartments 118i, 118ii are separated by an (interior, internal) divider (barrier) 136, which is defined by an outer (exterior) wall 138 of the compartment 118i, such that the compartments 118i, 118ii define discrete interior cavities 140i, 140ii, respectively. As discussed in further detail below, the compartments 118i, 118i are arranged in concentric relation such that the compartment 118ii extends about (circumscribes) the compartment 118i and such that the divider 136 extends in generally parallel relation to the longitudinal axis X.

In the illustrated embodiment, the compartment 118i is shown as being generally cylindrical in configuration. It is envisioned, however, that the particular configuration of the compartment 118i may be varied in alternate embodiments without departing from the scope of the present disclosure (e.g., depending upon the particular configuration of the tank body 300).

In order to facilitate fluid flow into and out of the compartments 118i, 118ii, the end cap 108 includes (first and second) inlet ports 124i, 124ii, and the end cap 112 includes (first and second) outlet ports 126i, 126ii. More specifically, the inlet ports 124i, 124ii are configured to allow compressed air to enter the compartments 118i, 118ii, and the outlet ports 126i, 126ii are configured to allow compressed air to exit the compartments 118i, 118ii, respectively.

The compartment 118i includes respective (first and second) ends 142i, 144i, and the compartment 118ii includes respective (first and second) ends 142ii, 144ii. In the illustrated embodiment, the tank body 300 is configured such that the compartments 118i, 118ii each extend from the end 102 of the tank body 300 to the end 104 of the tank body 300 along the entire length L thereof. More specifically, as seen in FIG. 6, the ends 142i, 142ii of the compartments 118i, 118ii are positioned (located) adjacent to each other and the end 102 of the tank body 300, and the ends 144i, 144ii of the compartments 118i, 118ii are positioned (located) adjacent to each other and the end 104 of the tank body 300. Embodiments in which the tank body 300 may be configured such that the ends 142ii, 144ii of the compartment 118ii are spaced inwardly from the ends 142i, 144i of the compartment 118i (i.e., along the longitudinal axis L) are also envisioned herein, however, as described in further detail below, and would not be beyond the scope of the present disclosure.

Figure 8:
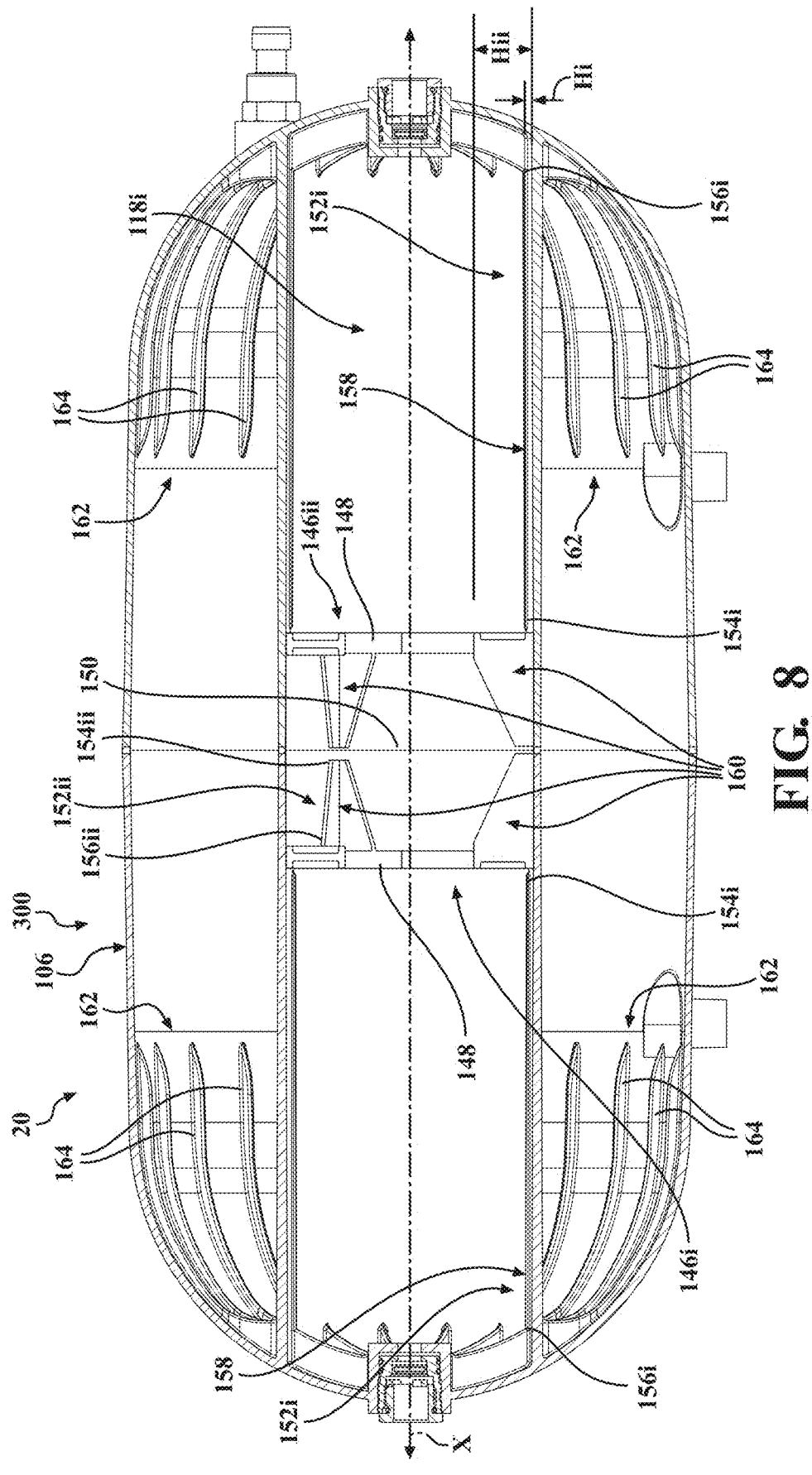
FIG. 8 is a cross-sectional view of the tank seen in FIG. 5 according to another embodiment of the present disclosure in which the tank includes (one or more) at least one (internal) reinforcement member.

With reference now to FIG. 8, in certain embodiments, it is envisioned that the tank 20 (i.e., the tank body 300) may further include (one or more) at least one (internal) reinforcement member 146, which is positioned (located) within and confirms to the configuration of the compartment 118i in order to inhibit (if not entirely prevent) deflection (deformation, buckling) thereof.

In the illustrated embodiment, the reinforcement member(s) 146 are configured as generally annular rings 148. It is envisioned, however, that the particular configurations of the reinforcement member(s) 146 may be varied in alternate embodiments without departing from the scope of the present disclosure (i.e., depending upon the particular configuration of the compartment 118i).

Although shown as including a pair of (i.e., first and second) reinforcement members 146i, 146ii, embodiments in which the particular number of reinforcement members 146 may be increased or decreased (e.g., depending upon the particular configuration and/or the particular size of the tank 20) are also envisioned herein, as are embodiments in which the reinforcement member(s) 146 may be omitted altogether, and would not be beyond the scope of the present disclosure.

While the reinforcement members 146 are shown as separate, discrete components of the tank body 300 in FIG. 8, embodiments in which the reinforcement member(s) 146 may be unitarily (monolithically) formed with the tank body 300 (i.e., such that the reinforcement member(s) 146 and the tank body 300 are integrally formed from a single piece of material) are also envisioned herein and would not be beyond the scope of the present disclosure.

The reinforcement members 146 are mounted within the compartment 118i such that the reinforcement members 146 are fixed in relation to an inner wall 150 thereof. More specifically, in the illustrated embodiment, the tank body 300 includes stoppers 152, which are constrain the reinforcement members 146 so as to inhibit (if not entirely prevent) movement thereof along the longitudinal axis X, thereby fixing the (axial, longitudinal) positions (locations) of the reinforcement member(s) 146 within the compartment 118*i*. Embodiments in which the reinforcement member(s) 146 may be mechanically connected (secured) to the inner wall 150 of the compartment 118*ii*, adhesively connected (secured) to the inner wall 150 of the compartment 118*ii*, welded to the inner wall 150 of the compartment 118*ii*, etc., either in addition to or instead of being constrained by the stoppers 152, are also envisioned herein, however, and would not be beyond the scope of the present disclosure.

In the illustrated embodiment, the tank body 300 includes (first) stoppers 152*i*, which have (first and second) ends 154*i*, 156*i*, and (second) stoppers 152*ii*, which have (first and second) ends 154*ii*, 156*ii*. The stoppers 152*i* are positioned (located) axially (longitudinally) outward of the reinforcement member 146 such that the stoppers 152*i* are positioned (located) axially (longitudinally) between the ends 102, 104 of the tank body 300 and the reinforcement members 146), and the stoppers 152*ii* are positioned (located) axially (longitudinally) between the reinforcement members 146.

The stoppers 152*i* include first configurations, and the stoppers 152*ii* include second configurations, which differ from the first configurations. More specifically, in the illustrated embodiment, the stoppers 152*i* are configured as (axial, longitudinal) braces 158, and the stoppers 152*ii* are configured as wedges 160, each of which is generally linear in configuration and extends in generally parallel relation to the longitudinal axis X.

Whereas the stoppers 152*i* each define a generally uniform height Hi, the stoppers 152*ii* each define a non-uniform height Hii that varies between the ends 154*ii*, 156*ii* thereof. More specifically, the stoppers 152*ii* are configured such that the heights Hii increase from the ends 154*ii* towards the ends 156*ii*.

As seen in FIG. 8, whereas circumferentially adjacent stoppers 152*ii* face in a common direction, axially adjacent stoppers 152*ii*, which are arranged in end-to-end (sequential axial) relation along the longitudinal axis X (i.e., such that the ends 154*ii* thereof are positioned (located) generally adjacent to each other), face in opposite directions. Although shown as being separated along the longitudinal axis X, embodiments in which axially adjacent stoppers 152*ii* may be positioned (located) in contacting relation are also envisioned herein and would not be beyond the scope of the present disclosure.

With continued reference to FIG. 8, in certain embodiments, it is envisioned that the tank 20 may include one or more (internal) strengthening members 162 (e.g., ribs 164), as indicated above. The strengthening member(s) 162 provide additional support to the tank body 300 (e.g., the compartment 118*i* and/or the compartment 118*ii*) in the areas corresponding to the open regions 204*i*, 204*ii*, and/or 204*iii* (FIG. 1) and further increase the strength of the tank 20 around (adjacent to) the mounting members 120, the respective inlet and outlet ports 124, 126, and/or the drain port(s) 128, respectively. As such, it is envisioned that the strengthening member(s) 162 may be included on the main body portion 106, the end cap 108, the end cap 112, or in any other necessary or desired position (location). Embodiments of the tank 20 including one or more strengthening members 162 in additional positions (locations) that are removed (spaced) from the open regions 204 are also envisioned herein, however, and would not be beyond the scope of the present disclosure (e.g., in order to increase the strength of the tank 20 in one or more areas that are subject to increased load, etc.).

Figure 9:
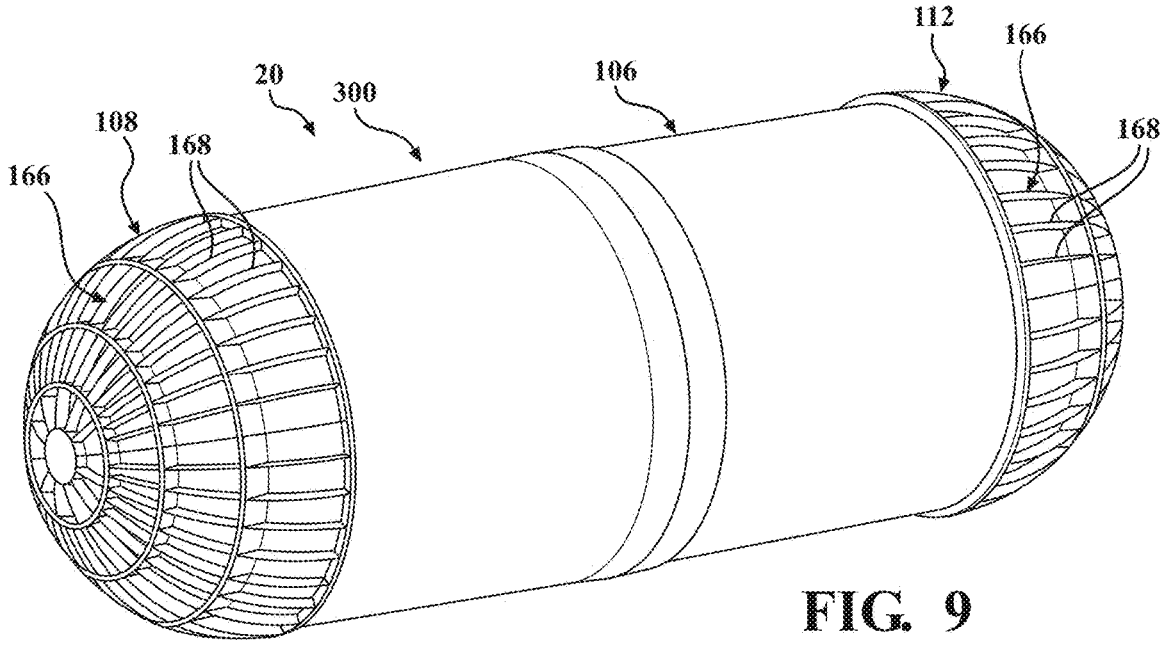
FIG. 9 is a side, perspective view of a (high-pressure) tank according to another embodiment of the present disclosure, which includes a shield (protective covering).

Additionally, or alternatively, it is envisioned that the tank 20 may include a shield (protective covering) 166, as seen in FIG. 9, in order to further increase the strength (e.g., the rigidity) thereof and protect the tank 20 from stones, rocks, and other such debris. In such embodiments, it is envisioned that the shield 166 may be formed integrally (i.e., monolithically, unitarily) with the tank body 300 (i.e., the main body portion 106 and/or the end caps 108, 112) from a single piece of material or as one or more discrete (separate) components that may be connected to the tank body 300 in any suitable manner (e.g., via welding, via an adhesive, via one or more mechanical fasteners, etc.). Although shown exclusively in connection with the end caps 108, 112 in FIG. 9, it is envisioned that the shield 166 may be provided in any suitable location including, for example, the main body portion 106.

While the shield 166 is illustrated as including a plurality of generally axial (longitudinal) struts 168, it is envisioned that the shield 166 may include any components or structures and may be configured in any manner suitable for the intended purpose of protecting the tank 20 from debris in the manner described herein (e.g., generally annular (arcuate) struts, a web of interconnected struts, a honeycomb structure, etc.).

Although the strengthening members 162 and the shield 166 are illustrated in connection with the tank 20, it is envisioned that the strengthening members 162 and/or the shield 166 may be included on any of the embodiments described herein.

Figures 11, 12, 13:
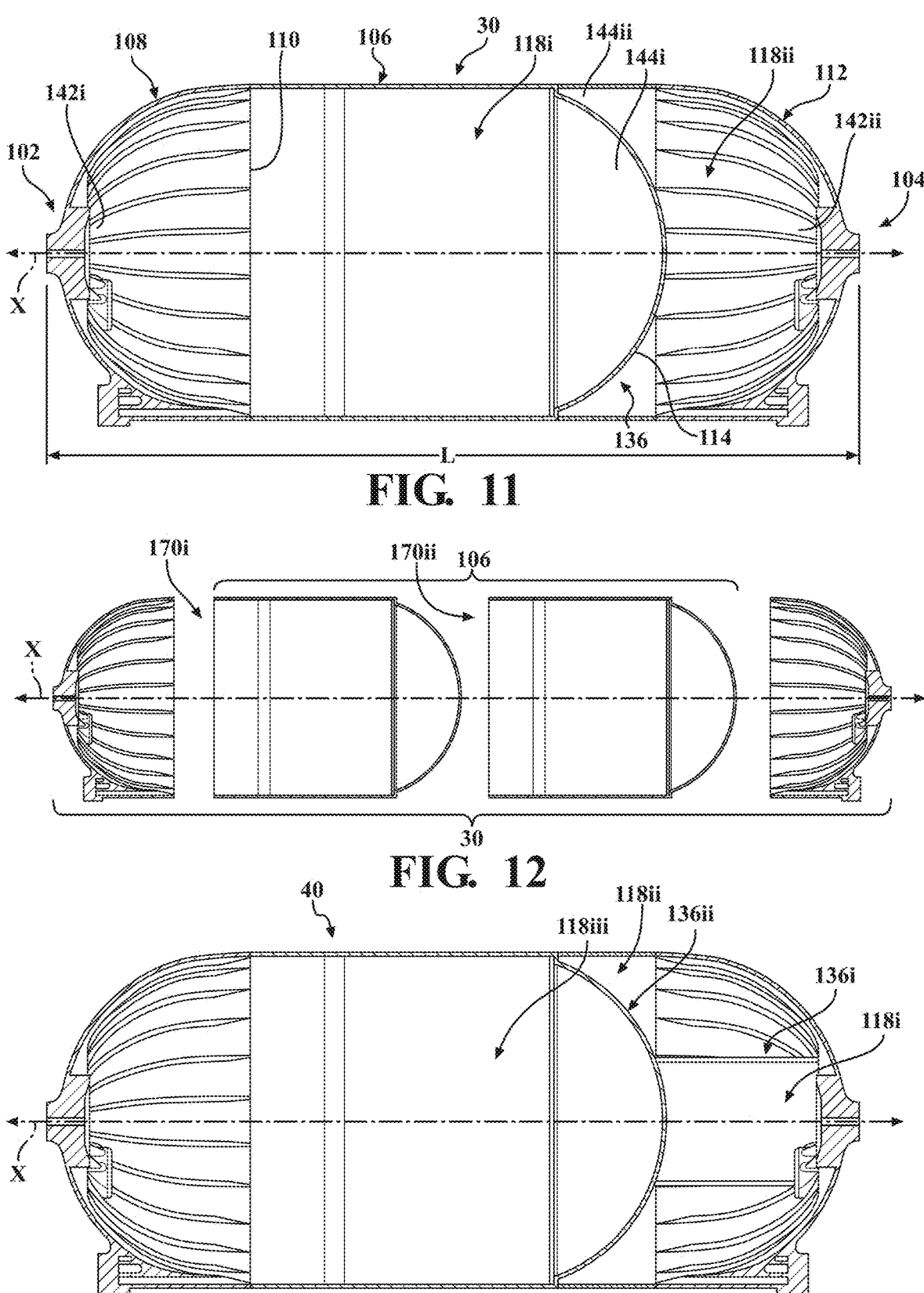
FIG. 11 is a cross-sectional view taken along line 11-11 in FIG. 10.
FIG. 12 is a side, perspective view of a (high-pressure) tank according to another embodiment of the present disclosure shown with parts separated.
FIG. 13 is a cross-sectional view of a (high-pressure) tank according to another embodiment of the present disclosure, which includes multiple (interior, internal) compartments that are arranged both concentrically and in end-to-end relation.

With reference now to FIGS. 10 and 11, another embodiment of the tank 20 will be discussed, which is identified by the reference character 30. The tank 30 is substantially similar to the tanks 10 (FIG. 1), 20 (FIG. 5) discussed above and, accordingly, will only be discussed with respect to any differences therefrom in the interest of brevity. As such, identical reference characters will be utilized to refer to elements, structures, features, etc., common to the tanks 10, 20, 30. In the interest of clarity, although included on the tank 30, the bolster 200 (FIG. 1) is not illustrated in FIGS. 10 and 11.

In contrast to the tank 20, in which the compartments 118*i*, 118*ii* are arranged concentrically, the compartments 118*i*, 118*ii* in the tank 30 are arranged in end-to-end (sequential axial) relation along the longitudinal axis X, whereby the compartments 118*i*, 118*ii* each extend along a portion the tank 30 only (i.e., along less than the entire length L thereof). More specifically, whereas the ends 142*i*, 142*ii* of the compartments 118*i*, 118*ii* are positioned (located) adjacent to the ends 102, 104 of the tank body 300, the ends 144*i*, 144*ii* of the compartments 118*i*, 118*ii* are spaced inwardly from the ends 104, 102 of the tank body 300 (i.e., along the longitudinal axis X), respectively, and are positioned (located) in adjacent relation.

In order to facilitate fluid flow into and out of the compartments 118*i*, 118*ii*, the end cap 108 includes the respective inlet and outlet ports 124*i*, 126*i*, and the end cap 112 includes the respective inlet and outlet ports 124*ii*, 126*ii*.

As a result of the end-to-end (sequential axial) arrangement of the compartments 118*i*, 118*ii*, the divider 136 defines the second end 114 of the main body portion 106 and extends in transverse (non-parallel) relation to the longitudinal axis X. As seen in FIG. 11, the divider 136 included in the tank 30 is non-linear (i.e., arcuate, curved) in configuration, in contrast to the generally planar configuration of the end 110 of the main body portion 106, which accommodates elevated internal pressures. More specifically, in the illustrated embodiment, the tank 30 is configured such that the divider 136 and, thus, the second end 114 of the main body portion 106, includes a generally hemispherical configuration, which attributes a generally cylindro-conoidal (i.e., bullet-shaped) configuration to the main body portion 106.

Although the ends 110, 114 of the main body portion 106 are shown as including dissimilar (i.e., non-identical) configurations, embodiments in which the divider 136 may include a generally planar configuration (i.e., such that the ends 110, 114 of the main body portion 106 include similar (e.g., identical) configurations) are also envisioned herein and would not be beyond the scope of the present disclosure.

In certain embodiments of the present disclosure, it is envisioned that the main body portion 106 may include multiple segments in order to increase the number of compartments 118 and/or the storage capacity of the tank 30. For example, FIG. 12 illustrates an embodiment of the tank 30 in which the main body portion 106 includes a (first) segment 170*i* and a second segment 170*ii*, which are arranged in end-to-end (sequential axial) relation along the longitudinal axis X. In such embodiments, it is envisioned that each segment 170 of the main body portion 106 may include respective inlet and outlet ports 124, 126 in order to facilitate fluid flow into and out of the segments 170.

Although shown as including two segments 170*i*, 170*ii* in the illustrated embodiment, it should be appreciated that the particular number of segments 170 may be increased in alternate embodiments of the present disclosure as necessary or desired.

With reference now to FIG. 13, another embodiment of the tank 20 will be discussed, which is identified by the reference character 40. The tank 40 is substantially similar to the tanks 10 (FIG. 1), 20 (FIG. 5), 30 (FIG. 10) discussed above and, accordingly, will only be discussed with respect to any differences therefrom in the interest of brevity. As such, identical reference characters will be utilized to refer to elements, structures, features, etc., common to the tanks 10, 20, 30, 40. In the interest of clarity, although included on the tank 40, the bolster 200 (FIG. 1) is not illustrated in FIG. 13.

In contrast to the tank 20 (FIG. 5), in which the compartments 118*i*, 118*ii* are arranged concentrically, and the tank 30 (FIG. 10), in which the compartments 118*i*, 118*ii* are arranged in end-to-end (sequential axial) relation along the longitudinal axis X, the tank 40 includes compartments 118 that are arranged both concentrically and in end-to-end (sequential axial) relation. More specifically, the tank 40 includes (first and second) compartments 118*i*, 118*ii*, which are arranged concentrically (i.e., such that the compartment 118*ii* extends about (circumscribes) the compartment 118*i*) and are separated by a (first) divider 136*i* that extends in generally parallel relation to the longitudinal axis X, and a (third) compartment 118*iii*, which is arranged in end-to-end (sequential axial) relation to the compartments 118*i*, 118*ii* and is separated therefrom by a (second) divider 136*ii* that extends in transverse (non-parallel) relation to the longitudinal axis X.

Persons skilled in the art will understand that the various embodiments of the present disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately)) 225° and the term "generally orthogonal" should be understood as referring to configurations in with the pertinent components are oriented so as to define an angle therebetween that is equal to 90°±25% (e.g., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A high-pressure tank for a vehicle, the high-pressure tank comprising:
a tank body defining a longitudinal axis, wherein the tank body is formed from a non-metallic material and includes:
a first compartment;
a second compartment isolated from the first compartment so as to inhibit fluid communication therebetween;
at least one reinforcement member positioned within the first compartment to inhibit deflection thereof; and
stoppers configured to constrain the at least one reinforcement member and thereby inhibit movement of the at least one reinforcement member within the first compartment; and
a bolster wound about the tank body to increase strength of the high-pressure tank.

2. The high-pressure tank of claim 1, wherein the second compartment extends about the first compartment.

3. The high-pressure tank of claim 1, wherein the at least one reinforcement member is configured as a discrete component of the tank body.

4. The high-pressure tank of claim 1, wherein the at least one reinforcement member is fixed in relation to an inner wall of the first compartment.

5. The high-pressure tank of claim 1, wherein the stoppers include:
first stoppers including a first configuration; and
second stoppers including a second configuration different than the first configuration.

6. The high-pressure tank of claim 1, wherein the tank body further includes:
a plurality of functional attachments distributed across the tank body.

7. The high-pressure tank of claim 6, wherein the bolster is applied to the tank body so as to define open regions extending about the plurality of functional attachments.

8. A high-pressure tank for a vehicle, the high-pressure tank comprising:
a tank body defining a first end, a second end, and a longitudinal axis, wherein the tank body is formed from a non-metallic material and includes:
a main body portion defining a first end and a second end;
a first end cap connected to the first end of the main body portion;
a second end cap connected to the second end of the main body portion;
a first compartment;
a second compartment separated from the first compartment by an internal divider; and
a plurality of functional attachments distributed across the tank body;
a bolster wound about the tank body to increase strength of the high-pressure tank, wherein the bolster is applied to the tank body so as to define open regions that extend about the plurality of functional attachments;
at least one reinforcement member positioned within the tank body to inhibit deflection thereof; and

stoppers configured to constrain the at least one reinforcement member and thereby inhibit movement thereof within the tank body.

9. The high-pressure tank of claim 8, wherein the first compartment and the second compartment each extend from the first end of the tank body to the second end of the tank body.

10. The high-pressure tank of claim 9, wherein the internal divider extends in generally parallel relation to the longitudinal axis.

11. A high-pressure tank for a vehicle, the high-pressure tank comprising:
a tank body defining a longitudinal axis, wherein the tank body is formed from a non-metallic material and includes:
a main body portion defining a first end and a second end;
a first end cap connected to the first end of the main body portion;
a second end cap connected to the second end of the main body portion;
a first compartment;
a second compartment separated from the first compartment such that the first compartment and the second compartment define discrete interior cavities; and
a plurality of functional attachments distributed across the tank body, wherein the plurality of functional attachments include:
a first inlet port configured to allow compressed air to enter the first compartment;
a first outlet port configured to allow compressed air to exit the first compartment;
a second inlet port configured to allow compressed air to enter the second compartment;
a second outlet port configured to allow compressed air to exit the second compartment;
a plurality of mounting members configured to connect the high-pressure tank to the vehicle; and
at least one drain port configured to facilitate drainage of the high-pressure tank; and
a bolster wound about the tank body to increase strength of the high-pressure tank, wherein the bolster is applied to the tank body so as to define open regions that extend about the plurality of functional attachments.

12. The high-pressure tank of claim 11, wherein the first inlet port and the second inlet port are each included on the first end cap, and the first outlet port and the second outlet port are each included on the second end cap.

13. The high-pressure tank of claim 11, wherein the first inlet port and the first outlet port are each included on the first end cap, and the second inlet port and the second outlet port are each included on the second end cap.

14. The high-pressure tank of claim 11, wherein the tank body further includes:
at least one reinforcement member positioned within the first compartment to inhibit deflection thereof.

15. The high-pressure tank of claim 14, wherein the tank body further includes:
stoppers configured to constrain the at least one reinforcement member and thereby inhibit movement of the at least one reinforcement member along the longitudinal axis.

16. The high-pressure tank of claim 8, wherein the second compartment extends about the first compartment.

17. The high-pressure tank of claim 16, wherein the internal divider is defined by an outer wall of the first compartment.

\* \* \* \* \*